United States Patent [19]

Frese

[11] 3,784,161

[45] Jan. 8, 1974

[54] WHEEL REMOVAL SAFETY DEVICE

[76] Inventor: Ralph L. Frese, 3109 Ross Rd., Palo Alto, Calif. 94303

[22] Filed: July 8, 1971

[21] Appl. No.: 160,831

[52] U.S. Cl. .................................. 254/88, 254/94
[51] Int. Cl. .......................... E02c 3/00, B66f 7/22
[58] Field of Search .............................. 254/88, 94

[56] References Cited
UNITED STATES PATENTS

| | | | |
|---|---|---|---|
| 1,961,873 | 6/1934 | Edmonds | 254/88 |
| 3,326,525 | 6/1967 | Kauppi | 254/88 |
| 1,408,408 | 2/1922 | Scott | 254/88 |
| 1,401,463 | 12/1921 | Cordes | 254/88 |

Primary Examiner—Othell M. Simpson
Attorney—Alfons Puishes

[57] ABSTRACT

A rotating or swiveling plate is mounted on bearings above a stationary bed plate so that it may assume an acute angle with the bed plate to provide a ramp or incline for the vehicle wheel to ride upon. When the vehicle rises to a predetermined height on the ramp, gravity causes the rotating plate to assume a horizontal position where it is held by a suitable automatic positive stop, the wheel then being elevated and ready for the next step in removal.

3 Claims, 4 Drawing Figures

PATENTED JAN 8 1974  3,784,161

INVENTOR.
Ralph L. Frese
BY
Alfons Pinskas
Attorney

WHEEL REMOVAL SAFETY DEVICE

BACKGROUND OF THE INVENTION

The problem of safe removal of wheels from automotive or other vehicles for purposes of repair, tire changing, etc., is one of as long standing as are the vehicles themselves.

Conventional jacks of the axle or bumper type are well known as are their disadvantages when used alone. The latter include difficulty in access, cumbersomeness and what is most important, danger from slipping and permitting the vehicle to fall before it can be raised in position, thereby causing damage to the vehicle or injury to the person or both.

The problem is aggravated in the case of vehicles such as campers, tractors and pick-ups where the clearance between the vehicle body and the ground is small. In the case of foreign cars where the wheels are designed to bend inward, the problem is further aggravated.

On some vehicles the spare wheel is located underneath the body, making it necessary to go under the body while the latter is in an elevated position to get to the spare wheel which is especially dangerous when conventional jacks are used alone.

In the case of heavy vehicles and particularly those having double wheels, the safety problem is also very acute. Attempts have been made to solve the problem in these cases by utilizing wooden support blocks having an inclined end, the latter permitting the vehicle to run up upon the block. The cumbersomeness and hazard of employing such a block is obvious.

SUMMARY OF THE INVENTION

My invention comprises essentially a lever, preferably of structural steel construction, arranged to pivot around horizontal pins or a fulchrum at approximately its center point. The pivots or fulcrum are supported structurally at a slightly elevated height above a base which forms an integral part of the device. The lever member may be lowered to form an inclined plane and thus serve as a drive-up plate for a vehicle wheel to ascend upon. After the wheel advances to a point such that its center of gravity is beyond the fulchrum or pivots, the plate or lever revolves around the pivots until it is in a horizontal position when a suitably positioned stop automatically prevents further motion. Provision is made to prevent forward motion of the fulchrum supports. A conventional jack may then be placed under the vehicle axle and the wheel raised sufficiently to make possible its removal with complete safety.

The entire device is so constructed as to permit ready assembly for use and disassembly and storage within the vehicle when not in use.

DESCRIPTION OF A PREFERRED EMBODIMENT

Figure 1:
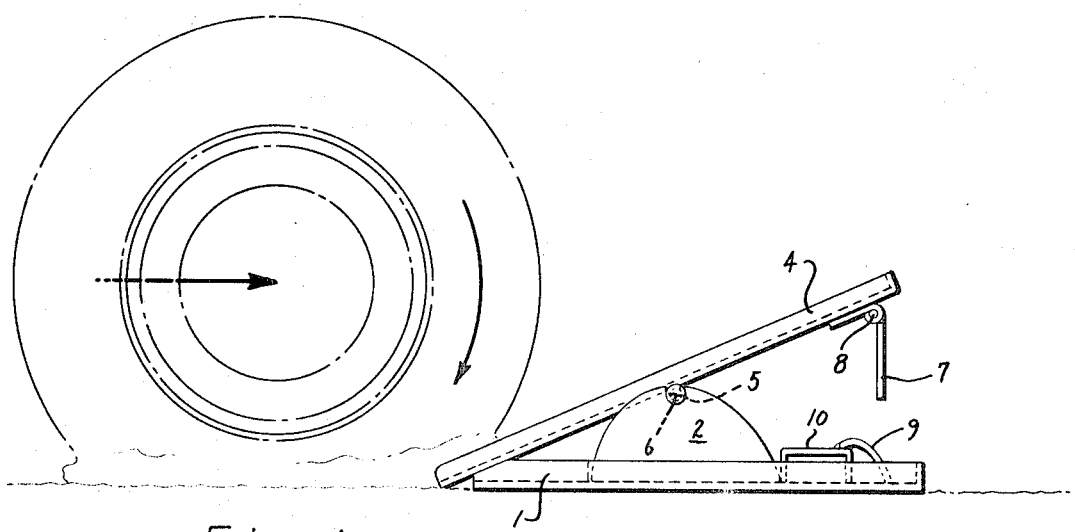
FIG. 1 is a side elevation of my invention showing it in position to receive the wheel to be removed.
Figure 2:
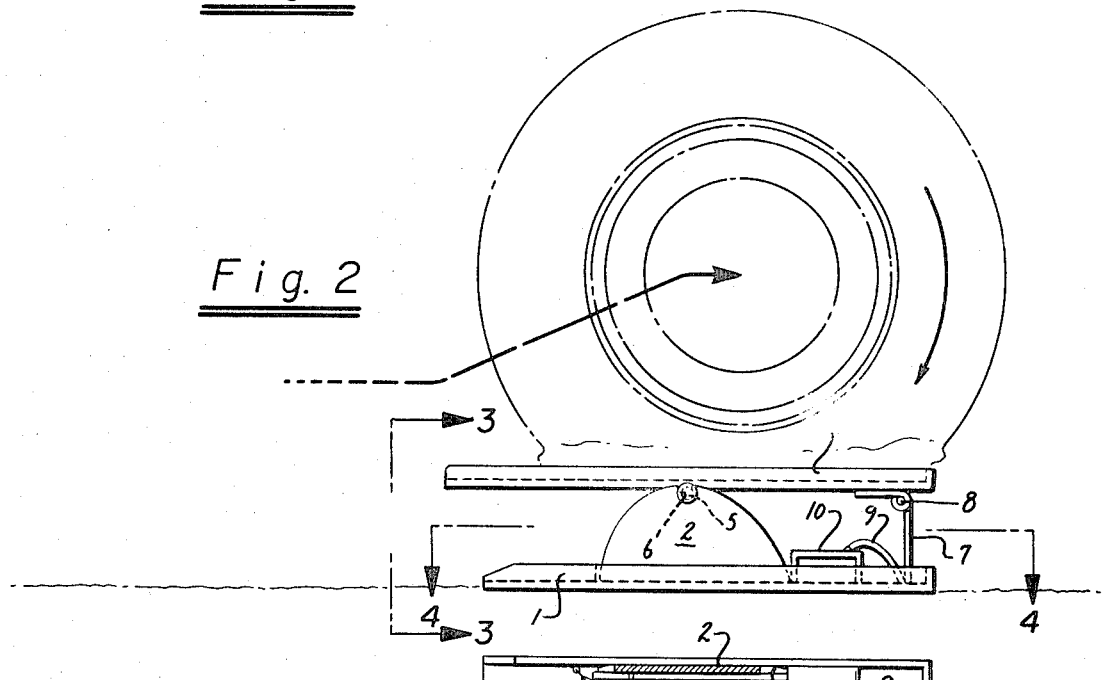
FIG. 2 is a side elevation showing my invention with the wheel elevated upon it.
Figure 3:
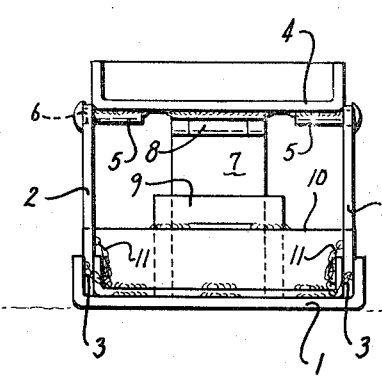
FIG. 3 is an end view along lines 3—3 of my invention in an elevated position to better illustrate its component parts.
Figure 4:
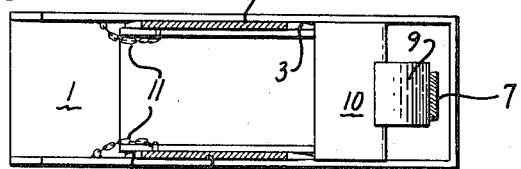
FIG. 4 is a longitudinal section along lines 4—4.

Referring now to the figures, there is seen the bed plate or base 1 which is disposed to receive side plates or fulchrum supports 2 on opposite sides. Side plates 2 are removably positioned in horizontal slots or recesses 3 which form a part of base 1.

Lever member or drive-up plate 4 is equipped with rocker pins 5 positioned therein and disposed to ride in slots 6 which act as bearing surfaces in side plates 2.

A trip plate or stop 7 rides on hinge 8 positioned on one end of plate 4. An arcuate shaped stop guide 9 is fixed in position by means of support 10 and base 1 by welding or otherwise.

Flexible members 11 which may be chains or similar devices are secured to side plates 2 and base 1 to prevent undue motion of plates 2 in recesses 3.

While I prefer to fabricate my device from ordinary mild steel using welding where applicable and as seen on the drawings, I may also employ stampings and utilize high strength aluminum or other alloys as will be evident to those skilled in the art.

It should be evident also that utilizing the construction shown I may readily assemble my device by merely inserting side plates 2 into slots 3 which form a part of base 1 as described above. I then insert pins 5 in slots 6 and my device is ready for use as described below. When finished with the device I may readily disassemble it by reversing the above steps and then store my device in the vehicle if desired.

OPERATION

To use my device I first remove it from storage and assemble it as described above. I then place it on the ground with plate 4 in an inclined position and up against the periphery of the wheel to be removed and in the direction of travel as shown in FIG. 1.

I then drive the vehicle in the direction shown by the horizontal arrow of FIG. 1 so that the wheel climbs the ramp formed by plate 4 until its center of gravity goes beyond pins 5. When this occurs, plate 4 will rotate about pins 5 in recesses 6 and approach a horizontal position. While this is occurring, trip plate or stop 7 will rotate around hinge 8 and its lower edge strike the surface of stop guide 9. The latter acts as a cam and guides stop 7 so that it finally bears on the top surface of base 1 and, combined with the weight of the vehicle, locks the latter in place with the wheel in an elevated position. Access to the under side of the vehicle may now be had with complete safety for the purpose of removing a spare wheel, inserting a jack, etc.

When the wheel has been replaced it may be lowered again on plate 4 and the vehicle backed off and down the ramp formed by plate 4 just as soon as the center of gravity passes over the center of pins 5.

The chains or similar devices 11 prevent undue movement of side plates 2 in slots 3 while the wheel is advancing on plate 4.

A special advantage of my invention is found in the case of double tired vehicles found on heavy trucks. In these cases, by use of my device under the inner tire, the outer one may be removed without the use of any jack whatsoever.

The tremendous advantages in convenience and safety attained through use of my device and the manner in which I have solved long standing problems should now be evident to those skilled in the art.

I claim:

1. A device for aid in removal of vehicle wheels comprising:

a stationary horizontal bed plate;

a pair of vertical side plates positioned on opposite parallel edges of said bed plate;

bearing means positioned at the upper ends of each of said side plates;

a rotating flat plate pivotally mounted in said bearing means to permit rotation of said plate in a vertical plane;

a hinged member pivotally mounted in one end of said rotating plate, said hinged member having an arm disposed for suspension in a generally vertical direction;

a stationary guide member of generally arcuate convex configuration fixedly positioned on said bed plate in cooperative relation with said arm of said hinged member, whereby the rotating motion of said rotating plate is stopped when said plate has attained a horizontal position by the action of said arm on said bed plate.

2. The device of claim 1 in which said side plates and said vertical plates are removably positioned on said bed plate.

3. The device of claim 2 including means for limiting the horizontal movement of said side plates.

* * * * *